United States Patent [19]

Fitzwater et al.

[11] Patent Number: 4,511,586
[45] Date of Patent: Apr. 16, 1985

[54] POTATO PRODUCT WITH OPPOSITE PHASE-SHIFTED CORRUGATIONS OF THE SAME FREQUENCY AND AMPLITUDE

[75] Inventors: Margaret Fitzwater, Lewisville; Lewis C. Keller, Watauga, both of Tex.

[73] Assignee: Frito-Lay, Inc., Dallas, Tex.

[21] Appl. No.: 519,986

[22] Filed: Aug. 3, 1983

[51] Int. Cl.$^3$ ............... A23L 1/212; A23L 1/216; A23P 1/00
[52] U.S. Cl. .................. 426/144; 426/550; 426/637; 426/808
[58] Field of Search ............ 426/104, 144, 549, 550, 426/615, 641, 637, 438, 512, 516, 517, 518, 808

[56] References Cited

U.S. PATENT DOCUMENTS

| | | |
|---|---|---|
| 678,514 | 7/1901 | Regnier . |
| 1,965,500 | 7/1934 | Knott . |
| 1,965,501 | 7/1934 | Knott . |
| 2,132,690 | 10/1938 | Hilliard .................. 426/144 |
| 2,612,453 | 9/1952 | Stahmer . |
| 2,686,720 | 8/1954 | La Rosa ..................... 426/144 |
| 2,769,715 | 11/1956 | Stahmer . |
| 3,358,379 | 12/1967 | Coley ...................... 426/144 X |
| 3,391,005 | 7/1968 | Babigan .................. 426/144 X |
| 3,956,517 | 5/1976 | Curry et al. ............ 426/808 X |
| 4,166,136 | 8/1979 | Stoll ......................... 426/144 |
| 4,219,575 | 8/1980 | Saunders ................ 426/438 X |
| 4,235,941 | 11/1980 | Coats ...................... 426/144 X |
| 4,337,275 | 6/1982 | Adams .................... 426/144 X |

FOREIGN PATENT DOCUMENTS

| | | | |
|---|---|---|---|
| 701899 | 1/1965 | Canada ................. | 426/144 |
| 898057 | 4/1972 | Canada ................. | 426/144 |

Primary Examiner—Arthur L. Corbin
Attorney, Agent, or Firm—Bernard, Rothwell & Brown

[57] ABSTRACT

Food product pieces are formed with corrugations on opposite sides thereof, wherein the corrugations are substantially parallel and of substantially equal frequency and amplitude, and wherein the corrugations on one side are phase-shifted with respect to the corrugations on the opposite side by about ¼ of the pitch distance of the corrugations. As a result, a food product piece with unique texture, flavor and appearance is produced after later cooking processes.

6 Claims, 5 Drawing Figures

POTATO PRODUCT WITH OPPOSITE PHASE-SHIFTED CORRUGATIONS OF THE SAME FREQUENCY AND AMPLITUDE

BACKGROUND OF THE INVENTION

1. Field of the Invention

The present invention relates to sliced food products which have corrugations on opposite surfaces and methods and apparatus of manufacturing such sliced products.

2. Description of the Background Art

Potato chips, such as described in U.S. Pat. No. 2,769,715 and having a wavy or corrugated configuration, are commercially manufactured and sold. The corrugated potato product which has met with substantial commercial success has parallel corrugations on the opposite surfaces thereof which are "in-phase", i.e., the ridges on one side directly overlie valleys on the opposite side so that the thickness of the chip is substantially uniform throughout the entire chip. U.S. Pat. No. 2,769,715 also discloses a sliced corrugated potato product wherein the corrugation on opposite sides are "out-of-phase", i.e., the ridges on one side directly overlie the ridges on the other side, and a sliced corrugated potato product wherein the corrugations on one side are crisscrossed relative to the corrugations on the opposite side. Such out-of-phase and crisscrossed corrugated potato products have periodically varying thicknesses throughout which, when subjected to a cooking process, such as frying, cook at different rates producing unique texture and flavor different from the products of uniform thickness. The out-of-phase corrugated product has substantial weaknesses at the mating opposing valleys of the product which results in undue breaking and fragmentation of the product during manufacture, packaging and handling. The crisscross corrugated product has substantially greater strength; however, existing processes and apparatus for manufacturing such crisscross corrugated products have one or more deficiencies, such as requiring excessive maintenance, being substantially more costly, having higher scrap losses, and restricted to only a small range of potato size, when compared to non-corrugated and in-phase corrugated potato products. Thus, commercialization of the out-of-phase and crisscross corrugated potato product has been limited.

U.S. patent application Ser. No. 447,643, filed Dec. 7, 1982, assigned to the assignee of this invention, discloses a food product with opposite parallel corrugations of different frequencies. The different frequencies of the corrugations provide the food product with varying thicknesses.

There thus remains a need in the art for an inexpensively produced corrugated food product with varying thicknesses which possesses unique flavor and texture characteristics after cooking.

SUMMARY OF THE INVENTION

The present invention is summarized in the formation of parallel corrugations of equal frequency and amplitude on opposite surfaces of a food product wherein the corrugations on one surface are phase-shifted relative to the corrugations on the opposite surface by about ¼ the pitch distance of the corrugations. The food product may be formed by cuts made by cutting slices from the body using offset alternate blades with flutes of equal frequency and amplitude or by other means, such as extrusion, sheeting, etc.

DESCRIPTION OF THE PREFERRED EMBODIMENTS

Figure 1:
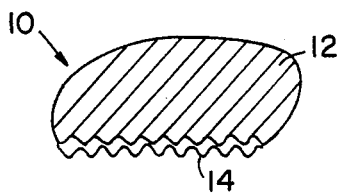
FIG. 1 is a perspective view of a potato slice formed in accordance with the invention.
Figure 2:
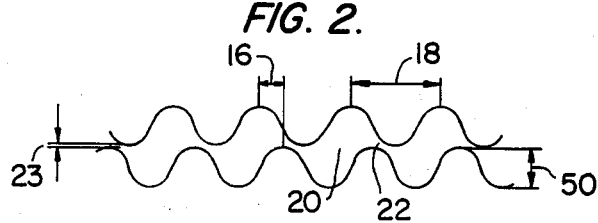
FIG. 2 is a cross-section of a broken away portion of the potato slice of FIG. 1.

As illustrated in FIGS. 1 and 2, a food product, such as a potato slice indicated generally at 10, manufactured in accordance with one embodiment of the present invention includes corrugations 12 on the upper side thereof and corrugations 14 on the lower side thereof. The corrugations 12 and 14 are substantially parallel to each other, have substantially the same frequency and amplitude, and are offset and phase-shifted relative to each other by a distance 16 of about one-fourth the pitch distance 18 (distances indicated by arrowed lines). The potato slices 10 have elongated areas 20 of substantially greater thickness interspersed with elongated areas 22 of lesser thickness. When sliced potato products 10 are cooked or fried in a conventional frier, they have a texture and flavor substantially similar to prior art cross-cut corrugated potato products.

Figure 3:
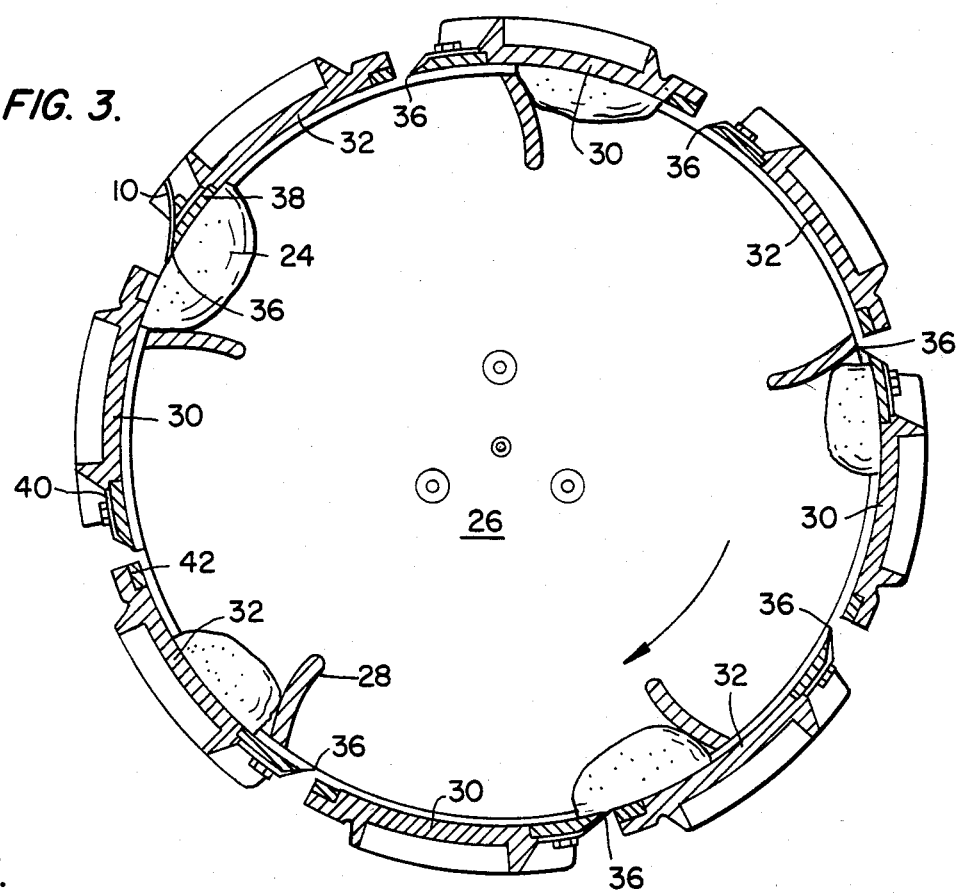
FIG. 3 is a horizontal section view of an apparatus for manufacturing potato slices in accordance with the invention.
Figure 4:
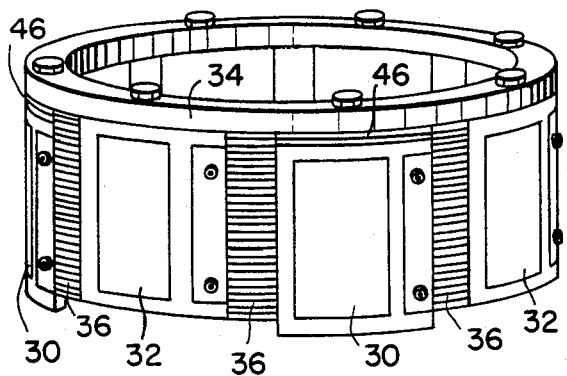
FIG. 4 is a side view of the apparatus shown in FIG. 3.

In preferred embodiments for the manufacture of potato slices 10, and with reference to FIG. 3, washed whole potatoes 24, which may be peeled or unpeeled, are fed onto a horizontal base 26 of a rotating impeller in a commercially available potato slicer. The impeller includes vertical vanes 28 which direct the potatoes 24 radially outward and against an interior cylindrical vertical surface formed by eight spaced slicing castings (shoes) 30 and 32. As shown in FIG. 4, the castings 30 and 32 are supported in a circular configuration by support ring 34. The cutting blades 36 are mounted by knife holders 38 and knife clamps 40 on leading vertical edges of corresponding alternate castings 30 and 32. Gate inserts 42 spaced from the cutting blades define therewith vertical slots through which the slices 10 are discharged as they are being cut.

Figure 5:
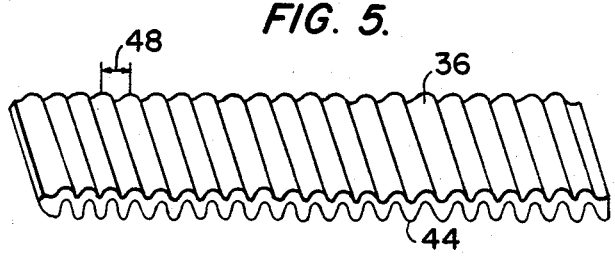
FIG. 5 is a perspective view of a cutting blade removed from the apparatus of FIG. 3 or FIG. 4.

As shown in FIG. 5, the cutting blades 36 are fluted. The flutes of all cutting blades 36 all have the same frequency and amplitude. The holders 38 and clamps 40 have corresponding grooves and ridges (not shown) for supporting the blade 36, with the sharpened cutting edges 44 of the blades 36 extending a selected distance into the interior of the slicing bowl for cutting slices from the potatoes 24 as the potatoes are moved by the impeller vanes 28 along the interior cylindrical surface.

As shown in FIG. 4, shims 46 offset every other casting 30 relative to the alternate castings 32 by a distance corresponding to ¼ of the flute pitch distance 48. Conveniently, the potato slicer is a conventional potato slicer, such as Model CC manufactured by Urschel Laboratories, Inc. of Valparaiso, Ind., modified by the insertion of shims 46 to vertically offset alternate castings 30 and 32 by an amount corresponding to ¼ of the flute pitch distance 48 of the cutting blades 36. The potato slices 10 are then subjected to conventional processing, including frying in a deep fat frier to form the potato chips.

Preferably, the corrugations 12 and 14 formed in the potato slices 10, prior to cooking, have an amplitude or a peak-to-valley dimension as illustrated by the arrowed line 50 in FIG. 2 within the range of from about 0.07 inch to about 0.1 inch, with about 0.09 inch being particularly preferred. The pitch distance 18 is preferably within the range of from about 0.12 inch to about 0.20 inch, with a pitch distance 18 of about 0.175 inch being particularly preferred. The thickness of the web portion 23, defined as the minimum thickness measured vertically between valleys, is preferably within the range of from about 0.01 inch to about 0.03 inch.

The potato slices 10 which have corrugations 12 on one surface which are phase shifted by about ¼ of the pitch distance 18, relative to parallel corrugations 14 on the opposite surface of the slice, are readily formed in conventional slicing apparatus wherein only every other casting 30 has been offset by shims 46. Other means besides shims can be employed, e.g., milling depressions in the support ring, or manufacturing "A" and "B" shoes which are of the same height but the corrugations are cast such that A and B peaks are offset one-fourth the pitch distance when mounted adjacent to each other on the support ring 34. This type of apparatus has demonstrated substantially greater reliability and higher through-put without requiring any prior sizing of the potatoes compared to prior art apparatus, including mechanisms for rotating the potatoes during successive cuts to produce crisscross corrugated potato slices.

While the above-described embodiment is particularly described with respect to slices of raw potatoes, the present invention is also applicable to other sliced products, including slices of other vegetables, such as carrots, slices of fruit, such as apples, or slices of other food materials, such as doughs, meat, etc. Additionally, the phase-shifted corrugations can be formed by techniques other than by slicing, for example, by extruding or impressing doughs, meat patties, etc. Unique texture and flavor properties are imparted by differential cooking times and the periodically varying thicknesses of the food product piece.

In a method of forming a food product from a dough material, the dough material is formed into ribbon or sheet which has corrugations on its upper and lower surfaces which are phase-shifted as described above. The dough is formed in a conventional manner from cereals, vegetables, and other materials. The corrugations are formed either by extruding the dough through a slot-like orifice having opposite fluted edges which are offset by ¼ of the distance of the flute pitch or by impressing the corrugations on a dough sheet formed from the dough, such as by passing the dough through a pair of sheeter rolls having offset corrugations and being spaced to produce the corrugated sheet or ribbon. The corrugated sheet or ribbon can be cooked, such as by frying, prior to being divided into product pieces, or the corrugated sheet or ribbon can be first divided into pieces which are then cooked or fried.

Since many modifications, variations and changes in detail may be made to the described embodiment, it is intended that all matter in the foregoing description and shown in the accompanying drawings to be interpreted as illustrative and not in a limiting sense.

What is claimed is:

1. A food product comprising a potato slice or potato dough sheet having substantially parallel corrugations on opposite surfaces thereof, said corrugations having substantially the same frequency and amplitude, wherein the corrugations on one surface are phase shifted with respect to the corrugations on the opposite surface by about ¼ of the pitch distance of the corrugations.

2. The food product of claim 1, wherein the potato slice or potato dough sheet is fried.

3. The food product of claim 2, wherein the corrugations have a pitch within the range of from about 0.12 inch to about 0.20 inch.

4. The food product of claim 3, wherein the corrugations have an amplitude within a range of from about 0.07 inch to about 0.1 inch.

5. The food product of claim 4, wherein the web portion of the slice or dough sheet is within the range of from about 0.01 inch to about 0.03 inch in thickness.

6. The food product of claim 5, wherein, prior to frying, the corrugations have an amplitude of about 0.09 inch and a pitch of about 0.175 inch.

* * * * *